United States Patent [19]
Morgan et al.

[11] Patent Number: 5,689,724
[45] Date of Patent: Nov. 18, 1997

[54] GENERIC FONT SPECIFICATION LEADING TO SPECIFIC FONT SELECTION

[75] Inventors: Scott Anthony Morgan; Troy Gary Reish; Craig Ardner Swearingen, all of Austin, Tex.

[73] Assignee: International Business Machines Corporation, Armonk, N.Y.

[21] Appl. No.: 540,761

[22] Filed: Oct. 11, 1995

Related U.S. Application Data

[63] Continuation of Ser. No. 175,337, Dec. 23, 1993, abandoned.

[51] Int. Cl.$^6$ ............................................... G06F 17/00
[52] U.S. Cl. ........................................................ 395/805
[58] Field of Search ................................. 395/150, 151, 395/805; 345/141–144; 364/419.1, 419.11–419.19

[56] References Cited

U.S. PATENT DOCUMENTS

| | | | |
|---|---|---|---|
| 4,594,674 | 6/1986 | Boulia et al. | 395/150 |
| 4,686,525 | 8/1987 | Nagata | 395/110 |
| 4,987,550 | 1/1991 | Leonard et al. | 395/150 |
| 4,995,089 | 2/1991 | Altrieth, III | 382/46 |
| 5,072,412 | 12/1991 | Henderson, Jr. et al. | 395/159 |
| 5,208,908 | 5/1993 | Harrison et al. | 395/150 |
| 5,212,770 | 5/1993 | Smith et al. | 395/155 |
| 5,226,148 | 7/1993 | Littlewood | 395/275 |
| 5,233,687 | 8/1993 | Henderson, Jr. et al. | 395/158 |
| 5,317,722 | 5/1994 | Evans | 395/700 |
| 5,339,240 | 8/1994 | Beaverson | 364/419.14 |
| 5,511,156 | 4/1996 | Nagasaka | 395/133 |
| 5,511,199 | 4/1996 | Anthias et al. | 395/700 |

OTHER PUBLICATIONS

Apple Computer, Inc., "The Font Manager: A Programmer's Guide", *Inside Macintosh*, pp. 1–15, 1985.
Barkakati, *Unix™ Desktop Guide to X/Motif™*, pp. 70–80, 1991.
Moore, "Elseware technologies promise more efficient font portability", PC Week, v. 10, n. 17, p. 39, May 1993.
IBM Technical Disclosure Bulletin, vol. 33, No. 2, Jul. 1990, Push–Button Control That Uses Application–Specified Fonts. p. 41.
IBM Technical Disclosure Bulletin, vol. 33, No. 2, Jul. 1990, Static Text Control That Will Use Application–Specified Fonts, p. 46.
IBM Technical Disclosure Bulletin, vol. 30, No. 9 Feb. 1988, Active Font List, pp. 147–150.
IBM Technical Disclosure Bulletin, vol. 36, No. 1, Jan. 1993, Personal Computer Screen Switchable Mode, pp. 146–150.
IBM Technical Disclosure Bulletin, vol. 30, No. 6, Nov. 1987, Underscore Facility Program For A Color Display Monitor, p. 51.

*Primary Examiner*—Heather R. Herndon
*Assistant Examiner*—Joseph R. Burwell
*Attorney, Agent, or Firm*—Jeffrey S. LaBaw

[57] ABSTRACT

A generic font request is changed to an operating system specific format font request. A font request is received from an application by a font handler. Both the application and the font handler are typically run by an operating system in a computer memory. Once the font handler determines that the font request is a generic font request, i.e. is in a format different than the operating system specific format expected by the operating system, it translates the generic font request to an operating system specific format font request.

20 Claims, 7 Drawing Sheets

GENERIC FONT SPECIFICATION LEADING TO SPECIFIC FONT SELECTION

This is a continuation of application Ser. No. 08/175,337 filed Dec. 23, 1993, now abandoned.

BACKGROUND OF THE INVENTION

This invention relates generally to a graphical user interface to control a computer system. More particularly, it relates to changing a generic font request to operating system specific font change request.

It is well known to provide a graphical user interface to allow a user to control a computer system and to present the results of user actions on the system display. In newer graphical user interfaces, it is possible for an application to select the font by which the information is displayed. However, with most operating systems, the syntax of the font string passed by the application must be exactly correct, or the attempt to set the font will fail. An application developer will naturally want to present itself in the most appropriate font given a particular run time environment. However, the coding effort necessary to port an application for all possible environments is so large that many will settle for using the default system font. This is particularly undesirable when a product is being marketed internationally, since the best font to use will vary from environment to another and may be critical to the product's acceptance.

Other problems are presented by using the system default font in all situations within a GUI. Some panels may need to be presented with different fonts than other panels in an application, to emphasize their relative importance to the user. An example might be a message box that is displayed indicating a particularly important error. The developer might want to use a larger or more bold faced font. Particular controls in a panel may need to use a different font from other controls, again to emphasize relative importance to the user, or to emphasize particular states in which the control may be. Optional fields could use prompt or prefix text that requires a different font, emphasizer or modifier from those of required fields.

This invention solves the problems of prior art graphical user interfaces.

SUMMARY OF THE INVENTION

Therefore, it is an object of the invention to translate a generic or incorrect font specification into a platform specific font format.

It is another object of the invention to choose the most appropriate font for a given run time environment based on generic or incorrect font specification.

These and other objects, features and advantages are accomplished by a font interface tool which allows an application to specify fonts in a generic manner. At run time, the generic or incorrect font descriptions are translated by the font interface tool into the exact syntax required for the platform on which the application is running. Thus, the font specific intelligence resides in the font interface tool, rather then requiring each application developer to understand how this is to be provided in their application.

BRIEF DESCRIPTION OF THE DRAWINGS

These objects, features and advantages will be more clearly understood with reference to the attached drawings and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2* Model 50, 60 Systems IBM Corporation, Part No. 68X2224 Order Number S68X-2224 and *Technical Reference Manual Personal Systems/2 (Model 80) IBM Corporation* Part No. 68X 2256 Order Number S68X-2254. One operating system which an IBM PS/2 personal computer may run is IBM's OS/2 2.0 (TM) for more information on the *IBM OS/2 2.0 Operating System* the reader is referred to *OS/2 2.0 Technical Library, Programming Guide Vol.* 1, 2, 3 Version 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserVer Hardware Technical* reference, Order No. SA23-2644-00. The AIX operating system is described in *General Concepts and Procedure—AIX Version 3 for RISC System/6000* Order No. SC23-2202-00 as well as other publications of the IBM Corporation.

Figure 1:
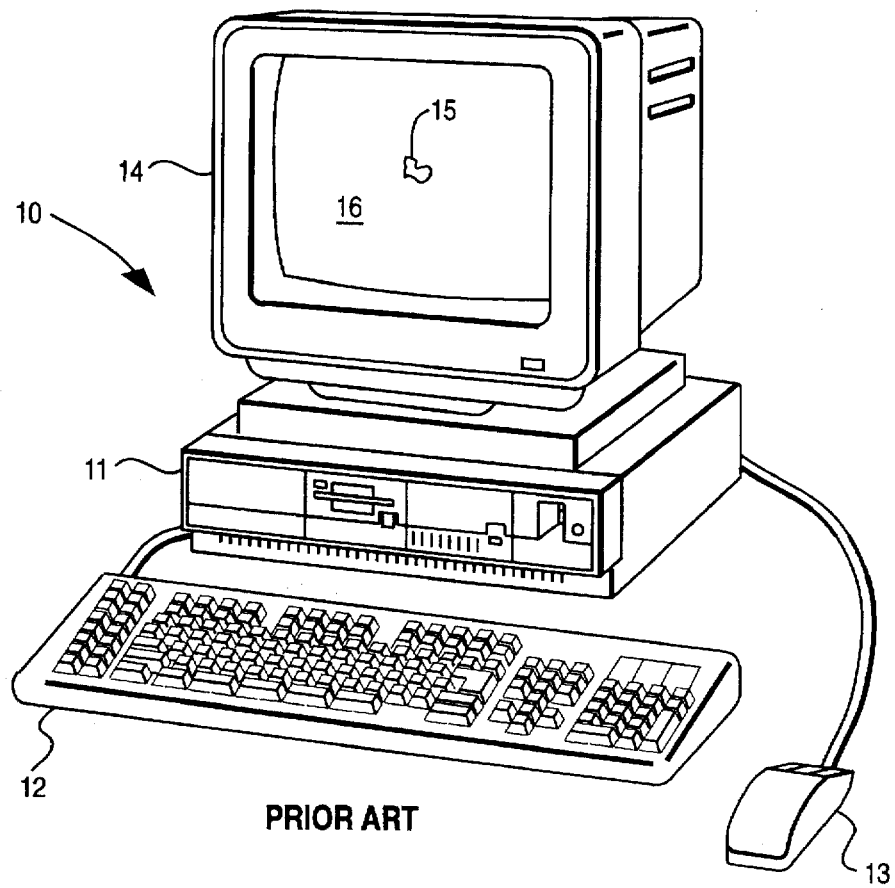
FIG. 1 shows a computer comprising system unit, keyboard, mouse and display.

In FIG. 1, a computer 10, comprising a system unit 11, a keyboard 12, a mouse 13 and a display 14 are depicted. The screen 16 of display device 14 is used to present the visual changes to the data object. The graphical user interface supported by the operating system allows the user to use a point and shoot method of input by moving the pointer to an icon representing a data object at a particular location on the screen 16 and press one of the mouse buttons to perform a user command or selection.

Figure 2:
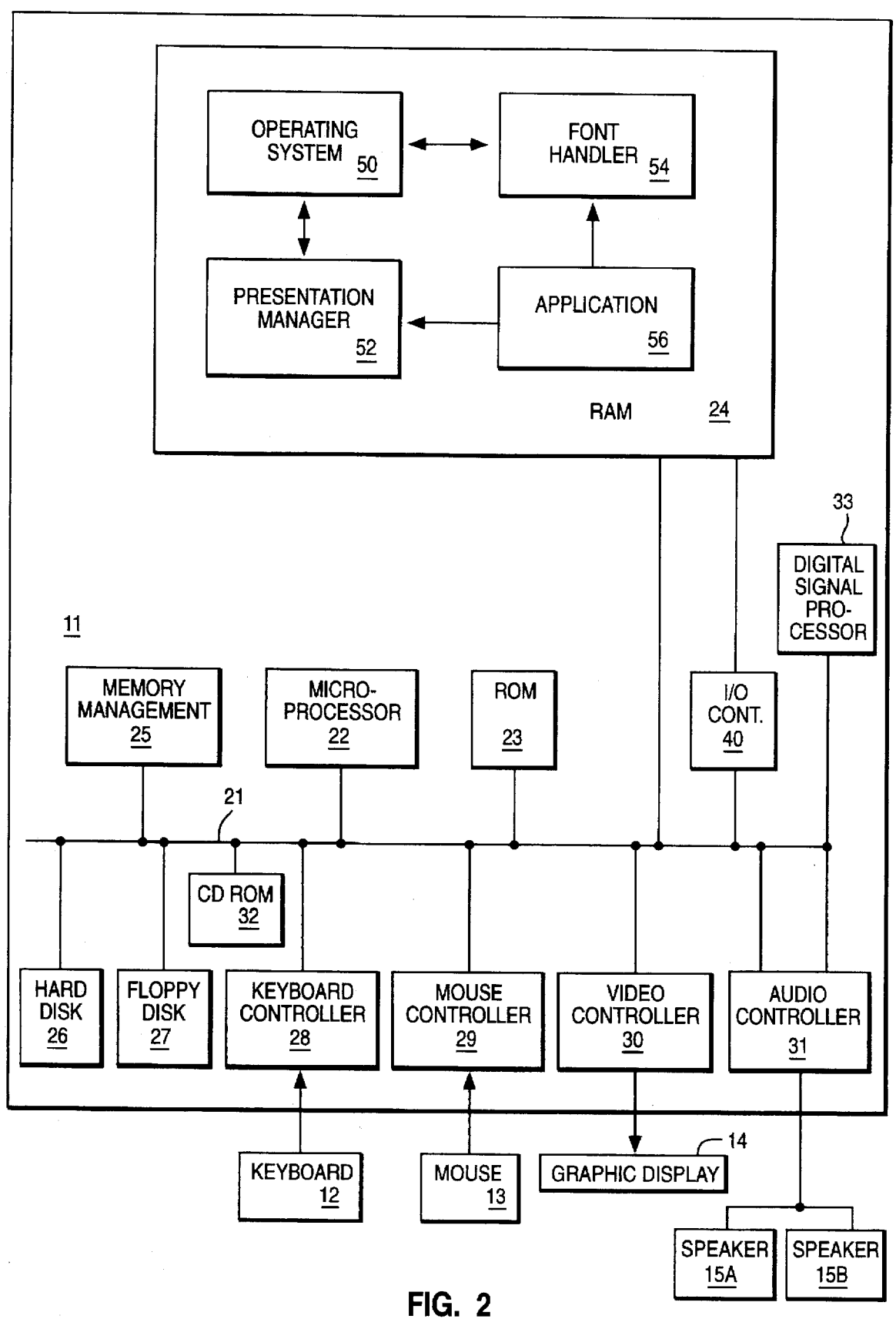
FIG. 2 is a block diagram of the components of the computer shown in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Also coupled to the system bus 21 is digital signal processor 33 which corrects the sound produced by the speaker system and is preferably incorporated into the audio controller 31. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory. Until required by the computer system, a set of instructions may be stored on a computer readable medium, for example, the hard disk in hard disk drive 26, optical disk in the CD ROM 32 or a floppy disk in the floppy disk drive 27. As shown in the figure, the operating system 50 and presentation manager 52 are resident in RAM 24. Some operating systems such as OS/2 have an embedded presentation manager. Other systems use a presentation manager which is a stand alone piece of code. In this example, the invention is embodied in a font interface tool 54 which is coupled to the operating system or presentation manager. An application 56 uses the font interface tool to have the operating system present its GUI in the most appropriate and available font on the system.

Font specification or change messages can be sent by the application 56 at any time to change the font of any panel that the application owns. Typical font specification or change times include when the application is first launched. During application initialization, the 'global' font to be used for the Graphical User Interface for the application can be set. The font specified at this time will serve as the default application font for all of the application's panels.

A font specification will also occur on panel creation. If the application has special needs to change the font of a specific panel, a change message is issued after the panel is created and before it is displayed to the user. Examples of this would be when a panel needs to be shrunk due to a large number of controls on the panel or grown for touch screens or vision impaired users.

Another time when a font may be specified is on application translation. Most applications are developed to support multiple languages to enable marketing to a world-wide customer base. Depending on the language, the font may need to be changed. Situations that may require this are countries that have different 'default' fonts than the US, translated languages that result in text strings that are longer and require a smaller font to fit on a panel, as well as fonts that may need to be enlarged so that glyphs, hyphens, and accents can be seen.

The font interface tool is a layer of abstraction that is placed on top of the native Operating System (OS) and below an application. It provides a layer of APIs, services, and messages that ease the development of Graphic User Interfaces. The application issues messages to the font interface tool and API calls and the tool then maps these calls into the necessary native operating system calls and messages. As a result, the application only needs to talk in a syntax which the font interface tool understands and the tool is responsible for talking the native OS language. This allows applications to run unchanged on multiple operating systems with the exception of possibly requiring a recompile.

Figure 3:
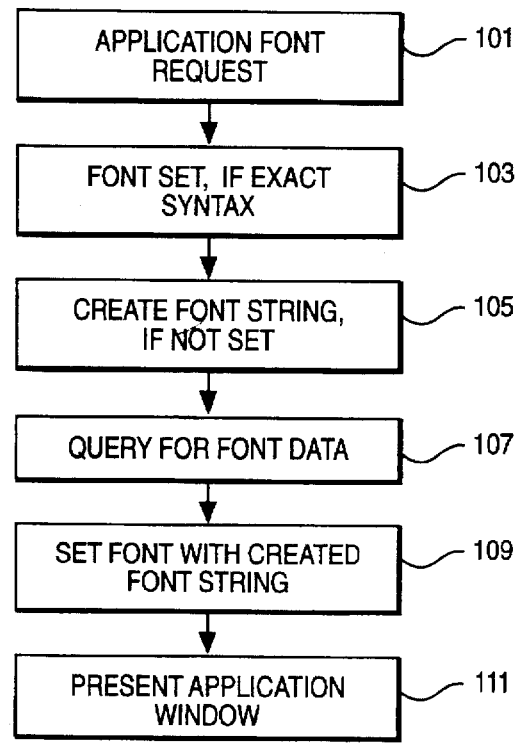
FIG. 3 is a flow diagram depicting the available process flow of the present invention.

The basic interactions between the operating system, the application and the font interface tool are depicted on the flow chart shown in FIG. 3. First, in step 101, the application requests a font from the font interface tool using FONTDEF structure which defines the generic font format. Second, in step 103, if the exact string is passed in, the font interface tool sets the font with the operating system. "Setting a font" with the operating system means to call the WinSetPresParam API, passing the font string and the window handle. The operating system should change the font for that window to the font indicated in the passed font string. The return code from this API indicates whether the font was successfully changed. Third, if the application has not sent a font string in the FONTDEF structure or the font string fails, the font interface tool creates the string to use, step 105. In step 107, the interface tool queries any needed font information from the operating system which the operating system returns. Several examples of font information which might need to be queried include what fonts are on the system, what characteristics (modifiers/emphasizers) each of these fonts support, and what point sizes each of these fonts support. In OS/2, this information can all be obtained or calculated from the information in the FONTMETRICS structures returned from the GpiQueryFonts call. Then, in step 109, the font interface tool sets the font using the string constructed from the generic data and sends it to the operating system. Then, in step 111, the operating system presents the application window according to the font set.

Normally, the application resident in the system must use the correct font format to have its information presented on the display as desired by the application and user. Examples of correct and incorrect font string formats in the OS/2 operating system follow. A message to OS/2 in the correct format for helvetica in both bold and italic in 10 pitch where the phrase is both outlined and underscored would read:
"10.Helvetica Bold Italic.Outline.Underscore"

The font string is in the format:
"point_size.font_name modifier modifier.emphasizer.emphasizer"

There is a period between point size and font name, a space before each modifier, and a period before each emphasizer. The modifiers are case sensitive, but not emphasizers. Modifiers such as bold and italic and emphasizers such as outline and underscore are optional. The distinction between modifiers and emphasizers is an OS/2-dictated distinction. In essence, modifiers change the style of the font, e.g., shape or boldness of the font, while emphasizers simply add unique characteristics to a font of given shape or boldness. OS/2 has the following Capitalization rules: Font names and modifiers capitalize first letter in each word. Emphasizers' capitalization is ignored.

With no emphasizers or modifiers, ten pitch helvetica would be presented with the message:
"10.Helvetica"
Any other font string format would be treated as an error. For example, if the application developer did not know the correct format or was confused as to whether a given variable was a modifier or emphasizer in OS/2, it would be relatively easy to place periods before the modifiers bold and italic above. The message passed to OS/2 would read:
"10.Helvetica.Bold.Italic.Outline.Underscore"
which would be treated as an error. As different operating environments will have similar but slightly varying font format requirements, one easily see that a programmer who ports his application from environment to environment could easily encounter problems.

If the format is incorrect, the request to change the presentation parameter may fail, or the correct parts may be taken and the incorrect parts ignored, depending on the operating environment and the exact nature of the format error. For example, in the OS/2 environment, if there is no period between point size and font name or there is a capitalization mistake or spelling error on the font or the modifier, there is complete failure of the message. Similarly, if there is no period before an emphasizer the font change fails. If there is a spelling error on an emphasizer, the emphasizer is ignored, other emphasizers will succeed. If there is a period before a first emphasizer, but missing before a subsequent emphasizer, all the emphasizers are ignored, even the one with the correct preceding period, but the rest of the change succeeds, i.e. new font and modifiers. Other operating environments have similar but slightly varying reactions to incorrectly formatted font change requests.

An incorrect font string is one that is not in the font interface tool understood format nor is understood by the operating system. A generic font string is one that the font interface tool is expecting and from which it can determine exactly what point size, font, emphasizers and/or modifiers are being requested.

In preferred embodiment, the font will be specified in a FONTDEF structure, composed as follows:

```
typedef struct_FONTDEF
{
    PSZ pszFontNameString;
    USHORT usPointSize;
    USHORT usFontSize;
    ULONG ulFont_Mods_Emphs
} FONTDEF;
``` where the PSZ pszFontNameString variable is the exact operating system syntax, the USHORT usPointSize variable is the desired font point size, the USHORT usFontSize variable is the desired font size in pels, the ULONG ulFont_Mods_Emphs variable is a 32-bit flag using #defines as font and FONTDEF variable contains the modifiers and/or emphasizers of the font change. By using the FONTDEF structure, the application can pass the font change message in the exact operating system syntax if desired, rather using the font interface tool generic font support.

If the application developer does not know the exact syntax, then the generic descriptors should be used, and the font interface tool will create the string to use in the syntax the operating system requires. Different versions of the font interface tool code will reside on different versions of the operating system, so that the syntax used by the tool will be that required for the operating system.

As shown in the flow diagram, the font interface support will set any combination of the desired point size, physical font size, the font, and any modifiers and emphasizers. If the point size is specified, the physical font size is ignored. Zero fields indicates a value is not being specified for that attribute. If the fontname string is passed in as well as some of the font interface needed information, then the fontname string will be tried first, but if that fails then the font will be selected per the generic processing based on that data.

The font interface tool uses the #define statements to equate #defines to specific operating system values. A case or switch statement in the code will equate the fonts to the desired font name string. The LOUSHORT macro just looks at the lower 16 bits of the 32 bit ulFont_Mods_Emphs structure element. This lower 16 bits are where the font name is specified. By just looking at the lower 16 bits, the bits set to the #defines for the font name can be compared, and find a direct match to know what font is requested. Only the case statement that matches the value in the lower 16 bits is executed in the switch statement—the rest of the case statements are ignored. This is possible because only one font name can be requested.

```
switch(LOUSHORT(FontDef.ulFont_Mods_Emphs)
{
    case 0x0001:
        pszFontName = "Tms Rmn";
        break;
    case 0x0002:
        pszFontName = "Courier";
        break;
    case 0x0003:
        pszFontName = "Helvetica";
        break;
}
```

For modifiers and emphasizers, since more than one of each can be set for these, each will be checked for sequentially, and the string created for them as we go. The strcat function concatenates the current string on to the string already in the buffer. Notice that the modifiers are preceded by the required space, while the emphasizers are preceded by the required period. The end result of this code will be to have created a string with all of the requested modifiers and emphasizers in the correct order, using the correct syntax and capitalization that will be recognized by the operating system. The "&" operator checks to see if the intersection of both operands is non-zero, i.e. checks to see if the same bit is set on in both sides.

```
if (HIUSHORT(FontDef.ulFont_Mods_Emphs) & ITALIC)
{
    strcat(pszModifiers, " Italic");
}
if (HIUSHORT(FontDef.ulFont_Mods_Emphs) &
ITALIC)
{
    strcat(pszModifiers, " Bold");
}
if (HIUSHORT(FontDef.ulFont_Mods_Emphs) &
OUTLINE)
{
    strcat(pszEmphasizers, ".Outline");
}
if (HIUSHORT(FontDef.ulFont_Mods_Emphs) &
UNDERSCORE)
{
```

```
            strcat(pszEmphasizers, ".Underline");
        }
        if (HIUSHORT(FontDef.ulFont_Mods_Emphs) &
STRIKEOUT)
        {
            strcat(pszEmphasizers, ".Strikeout");
        }
```

Several examples of #define statements for fonts, modifiers and emphasizers are provided below in the preferred format for the font interface facility. Those skilled in the art would recognize that other formats could be utilized for the #define statements.

```
FONTS:
    #define TIMES_ROMAN        0x00000001
    #define COURIER            0x00000002
    #define HELVETICA          0x00000003
EMPHASIZERS:
    #define OUTLINE            0x00010000
    #define UNDERSCORE         0x00020000
    #define STRIKEOUT          0x00040000
MODIFIERS:
    #define ITALIC             0x01000000
    #define BOLD               0x02000000
```

The 0x00000001 syntax denotes the number "1" in hexadecimal notation. Each digit in this notation represents four bits in the binary representation used internally in the computer. 0x00000001, 0x00000002, 0x00000003 are not bit-unique because internally they are represented in binary as:

00000000000000000000000000000001

00000000000000000000000000000010

00000000000000000000000000000011

The first and third numbers each have the first bit set, though they represent different numbers when taken in total.

The #defines for emphasizers, for example, are bit-unique. 0x00010000, 0x00020000 and 0x00040000 are represented internally as:

00000000000000010000000000000000

00000000000000100000000000000000

00000000000001000000000000000000

None of the bits overlap between #defines, so are can just check to see if a given bit is set on to see if that emphasizer or modifier is requested.

Fonts must be distinct, i.e. only one can be requested, so they are assigned constants that do not need to be bit-unique. Emphasizers and modifiers can be combined, i.e. more than one can be requested, so their constants must be bit-unique. Therefore, fonts can be assigned constants in the lower half of the 32-bit value, emphasizers and modifiers must be assigned constants in the upper half. This is the low 16 bits, or the right half of the ULONG when denoted in hexadecimal notation. The modifiers and emphasizers go in the high half of this structure element, or the left half when denoted in hex. This is transparent to the application, since this intelligence is build into the #define values assigned to each of these things. Zero in the font half of the means no font is specified. No emphasizers and no modifiers are also indicated by zeros in those bytes.

The font interface tool will equate these constants to the unique strings and case sensitivity that the operating system requires when setting fonts.

The invention can be run in a multi operating system environment, e.g., a network running DOS, Windows, and OS/2 clients at individual workstations. The generic nature of the font description allows it to be used on any platform or operating system that is supported by the font interface tool. Since the generic information is descriptive of the font and characteristics desired rather than being in an operating system specific format, the same generic description can be used in application code written for a variety of specific platforms. The version of the font interface running on that platform will convert the generic description into the proper syntax for that platform once the exact font, size and characteristics that are closest to those desired is found.

Figure 4A:
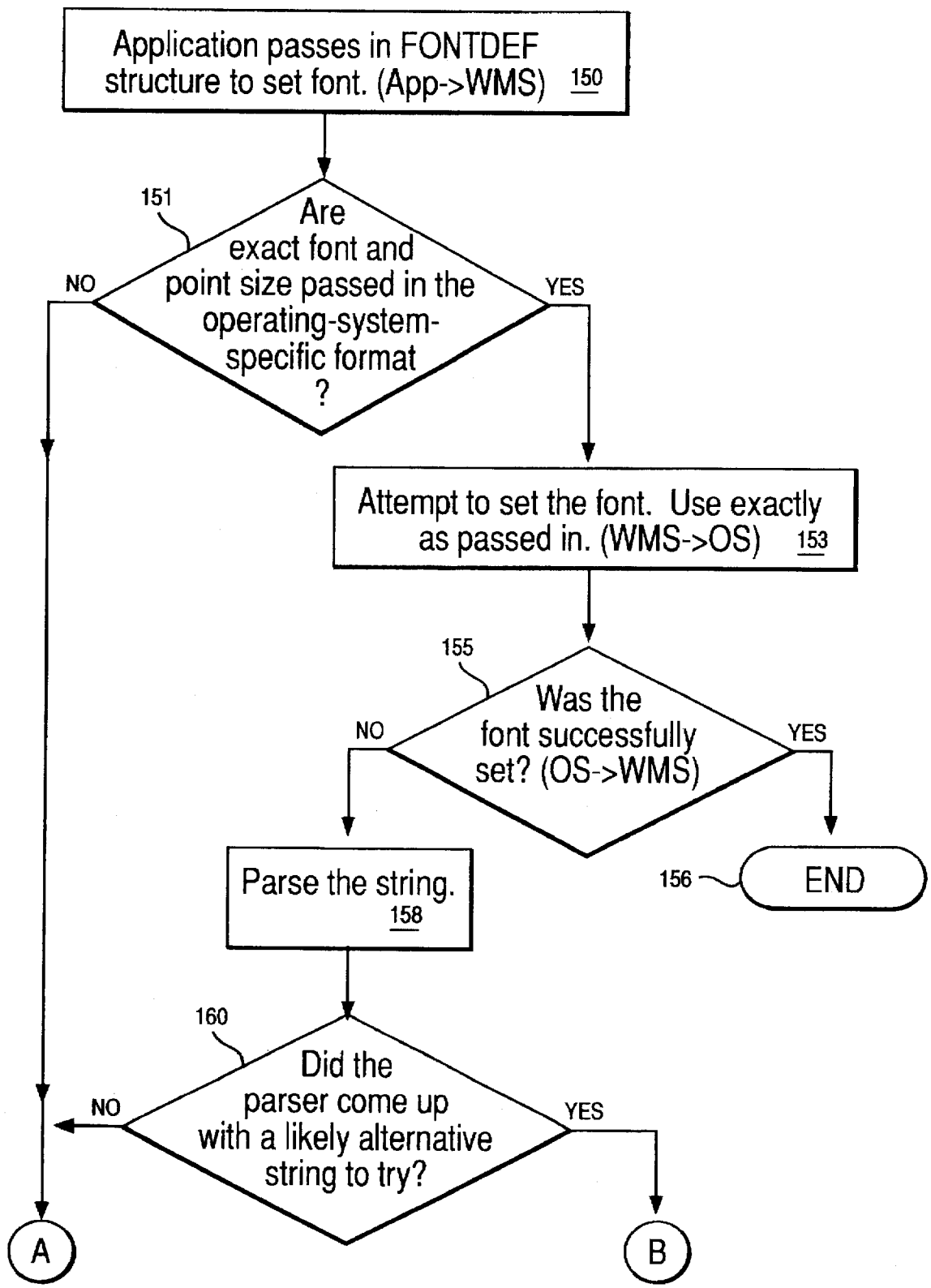
FIGS. 4A–4C show the process of changing a generic fonts specification to an operating systems specific specification.
Figure 4B:
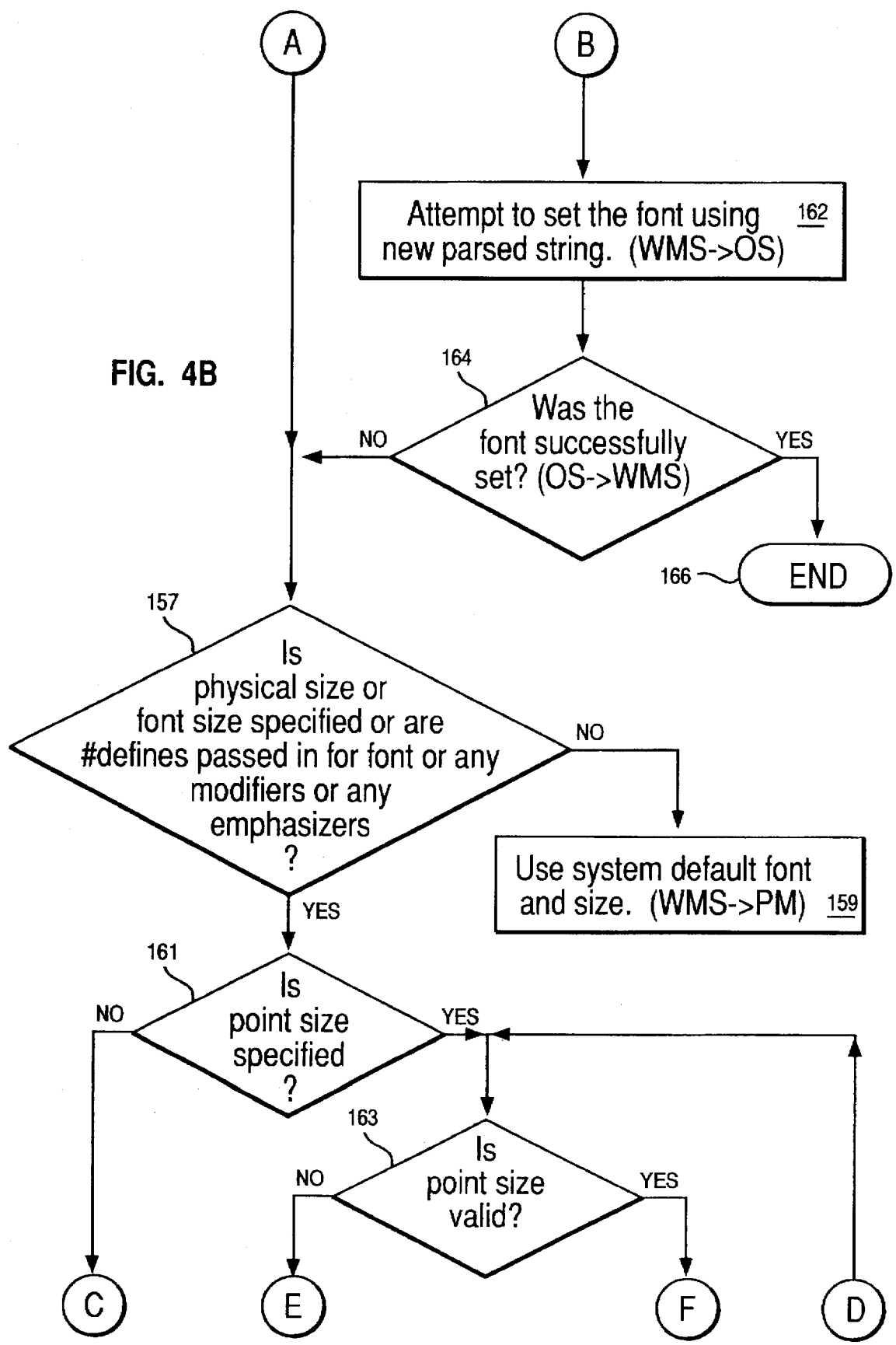
Figure 4C:
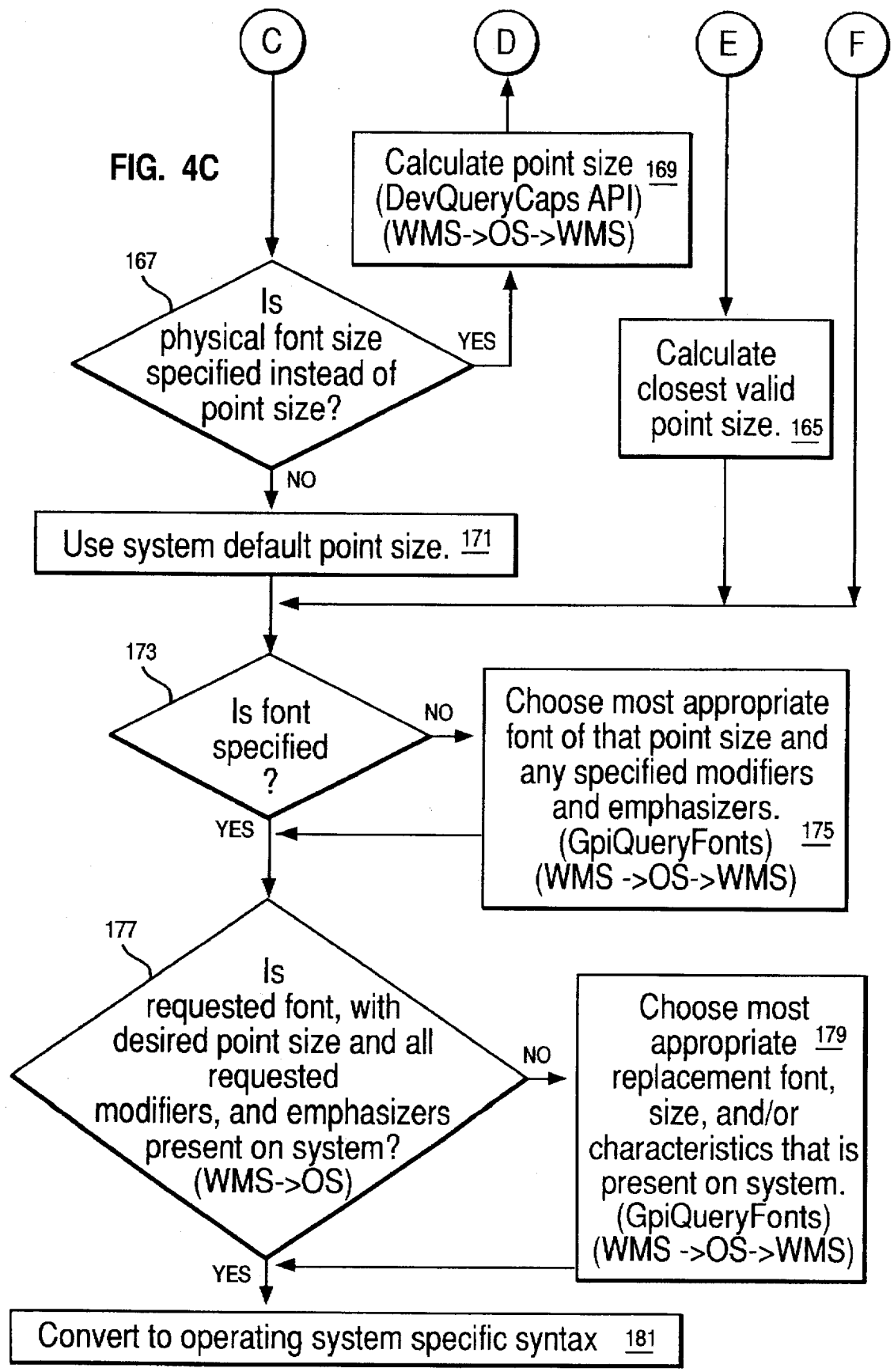

A more detailed process flow is depicted in FIGS. 4A through 4C. In step 150, the application passes a FONTDEF structure to the set the font. Optionally, the application may also pass an operating system specific font string. Thus, the invention gives the application the ability to try to set the font exactly, but provides a series of fail safes in case there is an error in format or spelling. In step 151, a test is performed to determine whether the exact font and point size were passed in an operating system specific format. If so, in step 153, the font interface tool attempts to set the font exactly as passed by the application by sending the operating system specific message on to the operating system. In step 155, a test is performed to establish whether the font was successfully set, usually by the presence or absence or an error message from the operating system. If the font was successfully set, the process ends, step 156. In step 157, the font interface tool determines whether there is any useful information in the FONTDEF structure passed by the application, i.e. whether there the physical size or font size is specified, or whether there are #define statements for font or any modifiers or emphasizers. If not, in step 159, the system default is used.

To attempt to make a more appropriate selection based on the system format string requires knowing why the match did not occur. It could be because of spelling error, capitalization, misplaced periods or spaces, or other typing type errors. To catch these and know what the application intended requires a parser or spell checker. A spell checker or parser can be added as an element of the font interface tool. If the font string is passed in and setting the font fails, then the parser can be invoked to see if the error(s) can be pinpointed and corrected to the most likely meaning as intended by the application. The font name could be matched against valid font names, and if no match is found, the closest match could be used. Any modifiers and emphasizers could be matched to the most likely intended meaning in the same manner as the font name. Any capitalization, ordering or punctuation errors could be corrected in the modified string. If the parsing found corrections that needed to be made, the new string is sent to the operating system to see if it will be successful in setting the font.

If the font was not set successfully in step 155, the parser is used in step 158 to find mispellings, capitalization and syntax errors. A test in step 160 determines whether the parser came up with a likely alternative font string to try in the operating system specific format. If an alternative string is identifed, in step 162 the font handler tries to set the font with the operating system. Step 164 tests whether the font was successfully set. If so, the application window is presented and the process ends, step 166.

The process continues with step 161 which determines whether a point size is specified. If so, step 163 determines whether the point size is valid. If the point size specified by the application is not valid, the closest valid point size is calculated in step 165. Valid point sizes on OS/2 are even numbers, e.g., 6, 8, 10, 12, 14, 18, 24. Any odd numbers are invalid, and any numbers between 6 and 24 that are not in the listed group are invalid.

If a point size is not specified, in step 167, a test determines whether a physical font size is specified. If a physical font size is specified, in step 169, the point size is calculated. If the physical font size is passed in instead of the point size, it must be converted to the appropriate point size for the given resolution of the screen. The screen resolution can be obtained with the DevQueryCaps API. Given that, and knowing there are 72 points per inch, the font interface tool can perform conversions to and from pels, points and inches.

To query the fonts on the system that the font interface tool may use, in OS/2, the tool calls the GpiQueryFonts API. Other functions would be called in the appropriate operating system. The GpiQueryFonts API will return font metric information on requested fonts. If a font name is supplied, the GpiQueryFonts API will return info just on fonts of that name. If no font name is supplied, the GpiQueryFonts API will supply info on all fonts in the system. The font interface tool loops through the returned font metrics structures, searching for the best match of the desired font. The modifier and emphasizer information is found in the font metrics information (jointly in fsType and fsSelection).

A sample font metric structure which would be returned by the API follows:

```
typedef struct_FONTMETRICS
{
    CHAR      szFamilyname[FACESIZE];
    CHAR      szFacename[FACESIZE];
    USHORT    idRegistry;
    USHORT    usCodePage;
    LONG      lEmHeight;
    LONG      lHeight;
    LONG      lMaxAscender;
    LONG      lMaxDescender;
    LONG      lLowerCaseAscent;
    LONG      lLowerCaseDescent;
    LONG      lInternalLeading;
    LONG      lExternalLeading;
    LONG      lAveCharWidth;
    LONG      lMaxCharInc;
    LONG      lEmInc;
    LONG      lMaxBaselineExt;
    SHORT     sCharSlope;
    SHORT     sInlineDir;
    SHORT     sCharRot;
    USHORT    usWeightClass;
    USHORT    usWidthClass;
    SHORT     sXDeviceRes;
    SHORT     sYDeviceRes;
    SHORT     sFirstChar;
    SHORT     sLastChar;
    SHORT     sDefaultChar;
    SHORT     sBreakChar;
    SHORT     sNominalPointSize;
    SHORT     sMinimumPointSize;
    SHORT     sMaximumPointSize;
    USHORT    fsType;
    USHORT    fsDefn;
    USHORT    fsSelection;
    USHORT    fsCapabilities;
    LONG      lSubscriptXSize;
    LONG      lSubscriptYSize;
    LONG      lSubscriptXOffset;
    LONG      lSubscriptYOffset;
    LONG      lSuperscriptXSize;
    LONG      lSuperscriptYSize;
    LONG      lSuperscriptXOffset;
    LONG      lSuperscriptYOffset;
    LONG      lUnderscoreSize;
    LONG      lUnderscorePosition;
    LONG      lStrikeoutSize;
    LONG      lStrikeoutPosition;
    SHORT     sKerningPairs;
    SHORT     sFamilyClass;
    LONG      lMatch;
    LONG      FamilyNameAtom;
    LONG      FaceNameAtom;
    PANOSE    panose;
} FONTMETRICS;
```

In the prior art, if the font is sent in operating system format and a match is not made, the application loses control of the font selection process. It is much better to choose the most appropriate font based on the application input as does the applicants' invention. The application can pass in both an exact string and also the generic information. If the string does not succeed, then any generic information also in the message will be used to select the font. This allows the application to use exact syntax if the application itself has font support built in, but also to set generic data to be used in case the run time environment is a case that the application's font support can not handle.

The calculated point size is tested in step 163. If the calculated point size is invalid, the closest valid point size is calculated in step 165. Step 169, which uses the DevQueryCaps API, calculates a point size based on the number of pels requested. The point size based on this pal count might not be valid, since there is no guarantee that the pel size passed in will equate exactly to a valid point size on the current screen resolution. This step just converts the pels to point size, then step 163 checks if it is valid. Since there are two paths from which a point size can originate, the validity is checked in step 163, so that the check is performed only once. If the font size is not specified either in terms of a point size or its physical size, in step 171, the system default point size is used.

In step 173, the font interface tool determines whether the font is specified. If the font is not specified, in step 175, the most appropriate font of that point size and any specified modifiers and emphasizers is used.

In step 177, a test is performed to determine whether the requested font, with desired point size and all the requested modifiers and emphasizers is present on the system. If the requested font is not available, in step 179, the most appropriate replacement font is chosen by the font interface tool. In OS/2, the GpiQueryFonts call can be used to determine the available fonts.

The conversion process in which the #defines are passed is shown in the last step of the flow diagram, step 181. The conversion step follows the rules of the particular operating system, to construct the actual string that is passed to the operating system. By this time, the #defines will have been converted to the actual strings that the operating system requires be used, and the string is ready to be put together out of the individual pieces of point size, font name, modifiers and emphasizers.

Figure 5:
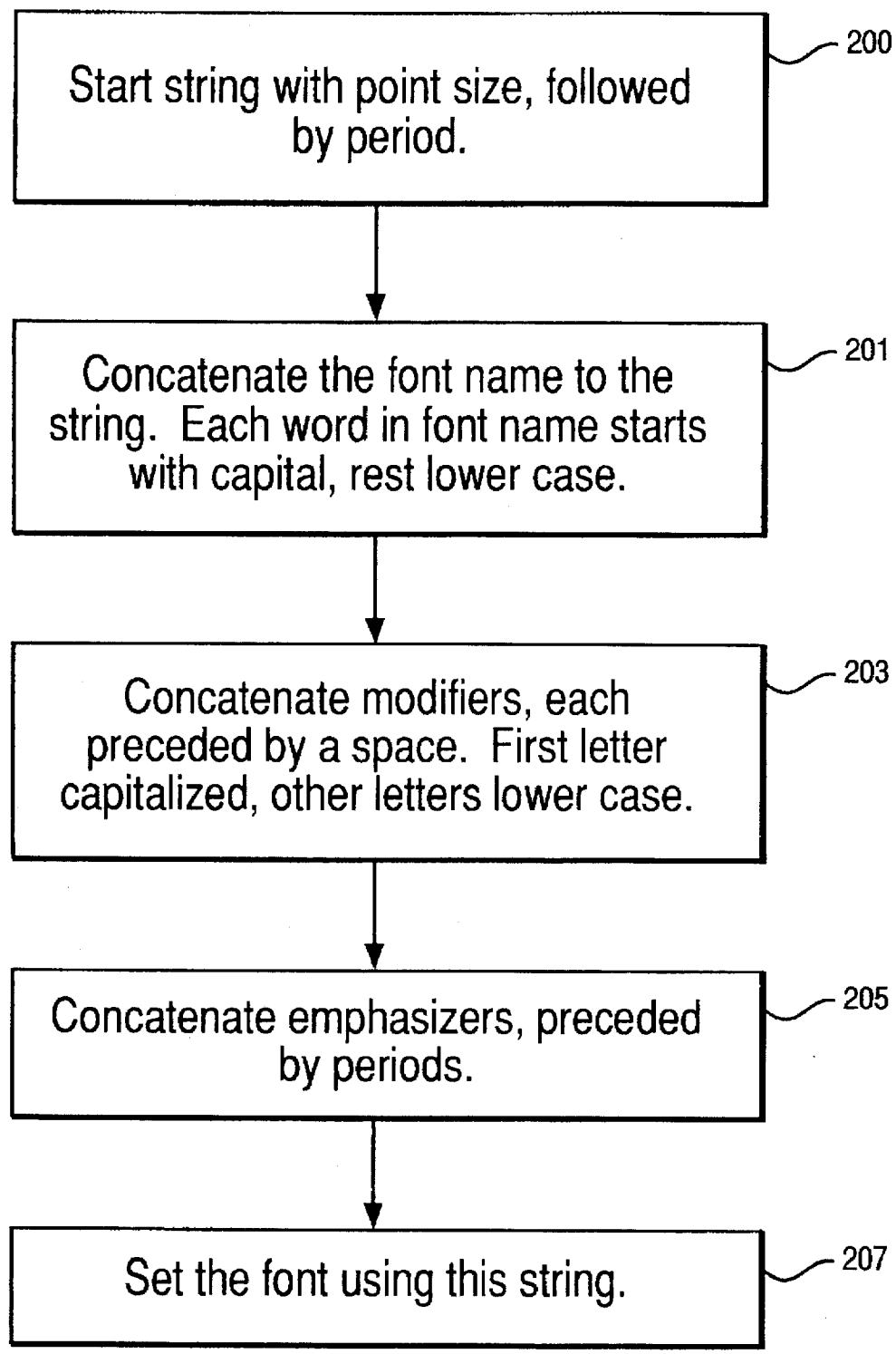
FIG. 5 depicts the process of converting a generic font specification to an operating system specific font specification.

The process for converting the font from a generic or incorrect format to an operating system specific format is depicted in FIG. 5. The process steps are specific to OS/2; other operating systems would have similar, but slightly different steps depending on their desired format. The process begins in step 200 which starts the string with the point size, followed by a period. In step 201, the font name is concatenated into the string. In OS/2, each word in the font name starts with a capital, the rest of the characters are lower case. Next, in step 203, the modifiers, if any, are concatenated into the string. Each modifier in OS/2 is preceded by a space, the first letter is capitalized and the rest are lower case. In step 205, the emphasizers are concatenated into the string. Each of the emphasizers are preceded by periods, but there are no capitalization rules in OS/2 for emphasizers. Finally, in step 207, the font handler sets the font using this string.

Figure 6:
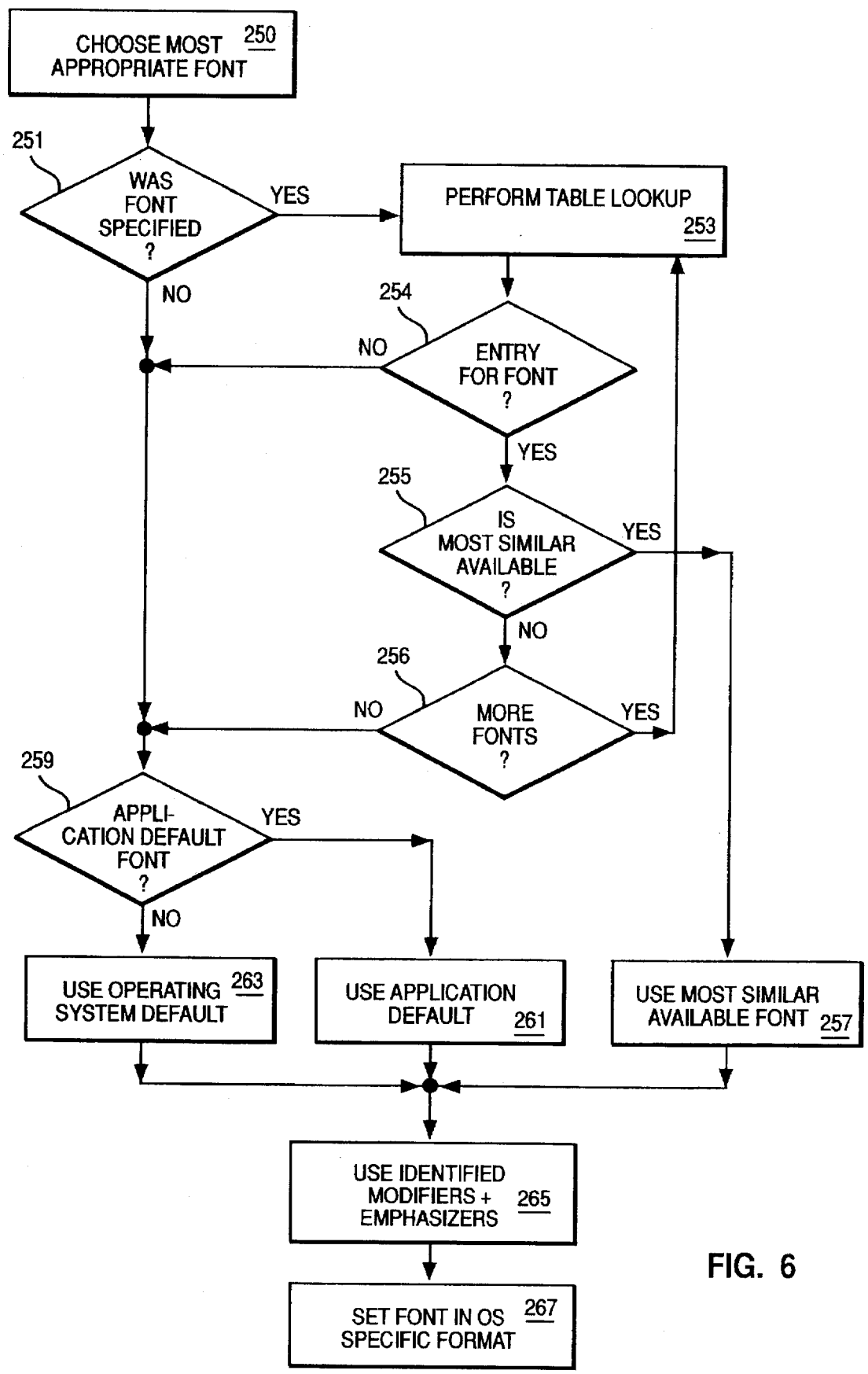
FIG. 6 depicts the process of choosing the most appropriate replacement font.

The process for choosing the most appropriate font is depicted in FIG. 6 and is invoked by step 175 or step 179 in FIG. 4C. The process begins in step 250 and proceeds to the test in step 251 which determines whether a font was specified by the application. If a font was specified, the process for choosing the most appropriate font was invoked by step 179 because the requested font was unavailable on the system. The process performs an iterative table lookup in step 253 until the test in step 255 determines that the most similar font is available. The table used in step 253 has a series of entries for a hundred or so of the more well known fonts, some of which may not be available on this particular system. The fonts which most closely resemble the specified font follow in order of similarity.

If an esoteric font is specified, i.e. one not in the table, after step 254 the process will proceed to step 259. Assuming that the font entry is known, the test in step 255 will determine whether the first replacement font is available on the system. If not available, step 256 will test whether there are more fonts in the table. The process will repeat until a most appropriate font is available and used in step 257, or all the similar fonts have been found to be unavailable on the system.

In step 259, if a font has not been specified, or if none of the similar replacement fonts are available on the system, the test determines whether an application default font has been specified. If so, the application default font is used in step 261. If no application default font has been specified, in step 263, the operating system default font is used. In step 265, all of the identified modifiers and emphasizers are added. Finally, in step 267, the font is set in the operating system specific format as described above in connection with FIG. 5.

The embodiment above includes a parser to try to find spelling errors, however, in the preferred embodiment, if the application wants the font interface tool to choose the most appropriate font, then it should not pass in the font description in operating system format. One purpose of this invention is to not force the application to know the exact system syntax for font selection, and to be able to get an close approximation of the desired font if a direct match is not made.

In OS/2, the WINQUERYPRESPARAM AND WINSET-PRESPARAM functions are used to query the application window for font and to set the font for an application window. Other operating systems would have similar functions. These are described below for sake of example. The WINQUERYPRESPARAM function queries the values of presentation parameters for a window.

```
#define INCL_WINSYS
#include <os2.h>
HWND    hwnd;
ULONG   idAttrType1;
ULONG   idAttrType2;
```

-continued

```
PULONG  pidAttrTypeFound;
ULONG   cbAttrValueLen;
PVOID   pAttrValue;
ULONG   flOptions;
ULONG   cbRetLen;
```

The hwnd variable (HWND) is the value input for the window handle. The idAttrType1 (ULONG) variable is the first attribute type identity. This identifies the first presentation parameter attribute to be queried. It can be zero to reference no presentation parameter attribute. The idAttrType2 (ULONG) variable is the second attribute type identity. This identifies the second presentation parameter attribute to be queried. It can be zero to reference no presentation parameter attribute. The pidAttrTypeFound (PULONG) variable is the Attribute type identity found. This identifies which of the presentation parameter attributes idAttrType1 and idAttrType2 has been found. This parameter can be passed as NULL (if, for example, only one attribute is being queried). The cbAttrValueLen (ULONG) variable is the byte count of the size of the storage pointed to the pAttrValue parameter. The pAttrValue (PVOID) variable is the output attribute value. The flOptions (ULONG) variable contains the options controlling the query. Any of these can be ORed together.

Two presentation parameter attribute identities can be passed, and both will be searched for along the chain of owners of the window hwnd (subject to QPF_NOINHERIT). The first one found satisfies the query. If both idAttrType1 and idAttrType2 are present for the same window, idAttrType1 takes precedence. If the presentation parameter attribute value is too long to fit in the pAttrValue buffer provided, it is truncated, and the number of bytes copied is returned in cbRetLen.

---

The WINSETPRESPARAM function sets a presentation parameter for a window.

```
#define INCL_WINSYS
#include <os2.h>
HWND    hwnd;
ULONG   idAttrType;
ULONG   cbAttrValueLen;
PVOID   pAttrValue;
BOOL    fSuccess;
fSuccess = WinSetPresParam(hwnd, idAttrType,
                cbAttrValueLen, pAttrValue);
```

---

The hwnd (HWND) variable is the window handle. The idAttrType (ULONG) variable is the attribute type identity. This is either one of the system-defined presentation parameter attribute types (See the id parameter of the PARAM data type), or an application-defined type. The cbAttrValueLen (ULONG) variable is the byte count of the data passed in the PAttr Value Paramet. The pAttrValue (PVOID) variable is the attribute value to which the presentation parameter should be set. See the abab[1] parameter of the PARAM data type for the values of system-defined attributes.

This function associates the presentation parameter attribute identified by idAttrType with the window hwnd. If the attribute already exists for the window, its value is changed to the new value specified by pAttrValue. If the attribute does not exist, it is added to the window's presentation parameters, with the specified value. When a presentation parameter is set, a WM_PRESPARAMCHANGED message is sent to all windows owned by the window calling the WinSetPresParam function.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method for changing a font request to a font request in an operating system specific syntax, comprising the steps of:

receiving a font request from an application run by an operating system, the application and operating system resident in a computer memory, the application font request being in one of a plurality of possible syntaxes;

determining that the application font request is in a syntax different than an operating system specific syntax expected by the operating system; and translating the application font request to an application font request in the operating system specific syntax.

2. The method as recited in claim 1 further comprising the steps of:

determining that a point size specified in the application font request is invalid for the operating system; and substituting a closest valid point size in the operating system specific font request for the point size specified in the application font request.

3. The method as recited in claim 1 further comprising the steps of:

determining that a font specified in the application font request is not available; and selecting a replacement font and point size for the operating system specific font request among fonts available to the computer memory according to the font, point size, emphasizers and modifiers specified in the application font request.

4. The method as recited in claim 1 further comprising the steps of:

parsing the application font request to correct for misspellings and syntax mistakes;

correcting the application font request; and translating the corrected application font request in the different syntax to the operating system specific font request in the operating system specific syntax.

5. The method as recited in claim 1 wherein the receiving, determining and translating steps are carried out by a font interface tool which intercepts application font requests to the operating system.

6. The method as recited in claim 5 wherein may be specified in more than one syntax and one of the syntaxes of the application font request is a generic syntax expected by the font interface tool.

7. The method as recited in claim 6 wherein the application font request is also made a syntax similar to the operating system specific syntax.

8. The method as recited in claim 1 wherein the operating system displays a plurality of panels on a computer system display in response to application requests and the application font request is made to change a default application font to a different font for a specific panel.

9. A system for changing a font request to a font request in an operating system specific syntax, comprising:

means for receiving a font request from an application run by an operating system, the application and operating system resident in a computer memory, the application font request being in one of a plurality of possible syntaxes;

means for determining that the application font request is in a syntax different than an operating system specific syntax expected by the operating system; and means for translating the application font request to an application font request in the operating system specific syntax.

10. The system as recited in claim 9 further comprising:

means for determining that a point size specified in the application font request is invalid for the operating system; and means for substituting a closest valid point size in the operating system specific font request for the point size specified in the application font request.

11. The system as recited in claim 9 further comprising:

means for determining that a font specified in the application font request is not available; and means for selecting a replacement font and point size for the operating system specific font request among fonts available to the computer memory according to the font, point size, emphasiers and modifiers specified in the application font request.

12. The system as recited in claim 9 further comprising:

means for parsing the application font request to correct for misspellings and syntax mistakes;

means for correcting the generic font request; and means for translating the corrected application font request in the different syntax to the operating system specific font request in the operating system specific syntax.

13. The system as recited in claim 9 further comprising:

a memory coupled to a systembus to store sets of instructions;

a processor coupled to the system bus to execute the sets of instructions; and a display coupled to the systembus to display data from the application in the font specified in the operating system specific syntax.

14. The system as recited in claim 13 wherein a plurality of computer systems are coupled to a network each running a different operating system and wherein the means for receiving, determining and translating are embodied in a font interface tool resident at each computer system, each font interface tool translating a given application font request to an appropriate operating system syntax for the operating system resident at the computer system.

15. The system as recited in claim 13 capable of running a plurality of operating systems, wherein the means for receiving, determining and translating are embodied in one or more font interface tools which intercept application font requests and translates them into the operating system specific syntax expected by a particular operating system.

16. A computer memory for storing sets of instructions for changing a font request to a font request in an operating system specific syntax, comprising:

means for receiving a font request from an application run by an operating system, the application and operating system resident in a computer memory, the application font request made in both an operating system specific syntax and a second syntax; and means for determining whether the application font request in the operating system specific syntax succeeds;

means for translating the application font request in the second syntax to an application font request in the operating system specific syntax, the means activated when the computer memory is coupled to and accessed by a computer.

17. The computer memory as recited in claim 16 further comprising:

means for determining that a point size specified in the application font request is invalid for the operating system; and means for substituting a closest valid point size in the operating system specific font request for the point size specified in the application font request.

18. The computer memory as recited in claim 16 further comprising:

means for determining that a font specified in the application font request is not available; and means for selecting a replacement font and point size for the operating system specific font request among fonts available to the computer memory according to the font, point size, emphasiers and modifiers specified in the application font request.

19. The computer memory as recited in claim 16 further comprising:

means for parsing the generic font request to correct for misspellings and syntax mistakes;

means for correcting the application font request; and means for translating the corrected application font in the different syntax request to the operating system specific font request in the operating system specific syntax.

20. A font interface tool for processing a font request generated by an application for appropriate presentation of an application interface on a computer display by an operating system comprising:

means for receiving a font request from an application run by an operating system, the application and operating system resident in a computer memory, the application font request in one or more of a plurality of possible syntaxes;

means for passing the application font request directly to the operating system if the application font request is in an operating system specific syntax;

means responsive to a failure to set a font according to the application font request in the operating system specific syntax for correcting the application font request in the one or more syntaxes to an application font request in the operating system specific syntax for the operating system on which the application is running; and means for setting a font in the operating system.

* * * * *